United States Patent
Gstöhl et al.

(10) Patent No.: US 9,540,032 B2
(45) Date of Patent: Jan. 10, 2017

(54) STEERING COLUMN FOR A MOTOR VEHICLE

(71) Applicant: THYSSENKRUPP PRESTA AKTIENGESELLSCHAFT, Eschen (LI)

(72) Inventors: Eric Gstöhl, Eschen (LI); Sven Hausknecht, Dornbirn (AT); Stefan-Hermann Loos, Rohschacherberg (CH); Mathias Senn, Grabs (CH)

(73) Assignee: THYSSENKRUPP PRESTA AKTIENGESELLSCHAFT, Eschen (LI)

( * ) Notice: Subject to any disclaimer, the term of this patent is extended or adjusted under 35 U.S.C. 154(b) by 0 days.

(21) Appl. No.: 14/649,012

(22) PCT Filed: Sep. 23, 2013

(86) PCT No.: PCT/EP2013/002854
§ 371 (c)(1),
(2) Date: Jun. 2, 2015

(87) PCT Pub. No.: WO2014/086439
PCT Pub. Date: Jun. 12, 2014

(65) Prior Publication Data
US 2015/0314801 A1 Nov. 5, 2015

(30) Foreign Application Priority Data
Dec. 6, 2012 (DE) .................. 10 2012 111 890

(51) Int. Cl.
*B62D 1/189* (2006.01)
*B62D 1/19* (2006.01)
*B23P 15/00* (2006.01)

(52) U.S. Cl.
CPC ............... *B62D 1/189* (2013.01); *B23P 15/00* (2013.01); *B62D 1/19* (2013.01); *B62D 1/195* (2013.01); *Y10T 29/49956* (2015.01)

(58) Field of Classification Search
CPC ........... B62D 1/189; B62D 1/19; B62D 1/195; Y10T 29/49956
See application file for complete search history.

(56) References Cited

U.S. PATENT DOCUMENTS

| | | |
|---|---|---|
| 3,769,851 A | 11/1973 | Edme et al. |
| 6,378,903 B1 | 4/2002 | Yabutsuka et al. |

(Continued)

FOREIGN PATENT DOCUMENTS

| | | |
|---|---|---|
| CN | 102069840 A | 5/2011 |
| EP | 0479455 A2 | 4/1992 |

(Continued)

OTHER PUBLICATIONS

German language International Search Report for International patent application No. PCT/EP2013/002854; mailing date Jan. 8, 2014.

(Continued)

*Primary Examiner* — Faye M Fleming
(74) *Attorney, Agent, or Firm* — thyssenkrupp North America, Inc.

(57) ABSTRACT

A steering column for a motor vehicle has an adjustment unit (4) which bears a section of the steering shaft (1) and which, in the open state of a locking apparatus (7), is pivotable relative to a bracket unit (5) about a pivot axis (12) for adjustment of the steering column in an adjustment direction (11) for a height or tilt adjustment. The pivot axis (12) is formed by a spindle bolt (24) which can be mounted so as to be fixed with respect to the vehicle and which extends through a first and a second elongated hole (22, 23) of the (Continued)

adjustment unit (4). In the event of a vehicle crash, the adjustment unit (4) is displaceable relative to the spindle bolt (24) with displacement of the spindle bolt (24) in the elongated holes (22, 23), wherein, in a region situated between the first and the second elongated hole (22, 23) in relation to the direction of the pivot axis (12), there is arranged an energy absorption part (27) with which the spindle bolt (24), during the displacement thereof in the elongated holes (22, 23), interacts with plastic deformation of the energy absorption part (27) owing to exertion of pressure on the energy absorption part (27) and displacement of material of the energy absorption part (27).

15 Claims, 3 Drawing Sheets (56) References Cited

U.S. PATENT DOCUMENTS

| | | | |
|---|---|---|---|
| 7,188,867 B2 | 3/2007 | Gatti et al. | |
| 7,874,228 B2 | 1/2011 | Clark et al. | |
| 2003/0209102 A1* | 11/2003 | Murakami | B62D 1/184 |
| | | | 74/493 |
| 2006/0043720 A1* | 3/2006 | Sawada | B62D 1/16 |
| | | | 280/775 |
| 2007/0228717 A1* | 10/2007 | Tanai | B62D 1/195 |
| | | | 280/777 |
| 2010/0242663 A1* | 9/2010 | Takezawa | B62D 1/189 |
| | | | 74/493 |
| 2015/0239490 A1* | 8/2015 | Sakata | B62D 1/195 |
| | | | 74/493 |

FOREIGN PATENT DOCUMENTS

| | | |
|---|---|---|
| EP | 0633180 A1 | 1/1995 |
| EP | 1187752 B1 | 9/2004 |
| EP | 1083109 B1 | 5/2006 |
| EP | 1707471 A1 | 10/2006 |
| EP | 1479593 B1 | 2/2008 |
| FR | 2708551 A1 | 2/1995 |
| FR | 2795035 A1 | 12/2000 |
| WO | 00/76832 A1 | 12/2000 |
| WO | 2008/083811 A1 | 7/2008 |
| WO | 2010/069448 A1 | 6/2010 |

OTHER PUBLICATIONS

English translation of International Search Report for International patent application No. PCT/EP2013/002854; mailing date Jan. 8, 2014.
English Translation of abstract of FR 2795035 (A1).
English Translation of abstract of FR 2708551 (A1).
English Translation of abstract of EP 0633180 (A1).
English Translation of abstract of CN 102069840 (A).

* cited by examiner

STEERING COLUMN FOR A MOTOR VEHICLE

The invention relates to a steering column for a motor vehicle, having a rotatably mounted steering shaft and having an adjustment unit which bears a section of the steering shaft adjoining a steering wheel-side end of the steering shaft and which, in the open state of a locking apparatus, is pivotable relative to a bracket unit about a pivot axis for adjustment of the steering column in an adjustment direction for a height or tilt adjustment and the pivoting of which relative to the bracket unit about the pivot axis is locked in the closed state of the locking apparatus, wherein the pivot axis is formed by a spindle bolt which can be mounted so as to be fixed with respect to the vehicle and which extends through a first and a second elongated hole of the adjustment unit, and wherein, in the event of a vehicle crash, the adjustment unit is displaceable relative to the spindle bolt with displacement of the spindle bolt in the elongated holes.

Adjustable steering columns permit an adaptation of the position of the steering wheel to the seating position of the driver. Nowadays, steering columns are normally adjustable not only in height or tilt but also in length.

In the event of a vehicle crash, a steering column should be capable of collapsing, with corresponding absorption of energy. For this purpose, it is known to provide two parts which are displaceable relative to one another in a displacement direction, wherein the displacement direction is generally parallel to that section of the steering shaft which adjoins the steering wheel-side end, which section is itself of telescopic form. Acting between the two parts that are displaceable relative to one another in the event of a crash, there is at least one element which imparts a force that opposes the displacement, in order to realize a predefined absorption of energy. For example, energy absorption parts may be provided which are formed from sheet-metal strips that are bent in a U shape, wherein, during the displacement of the two parts, bending work is performed on the sheet-metal strip. Instead of bending strips, it is also possible for tear-away strips to be provided. Such steering columns emerge for example from EP 1 479 593 B1, EP 1 707 471 A1 and EP 1 187 752 B1.

EP 0 479 455 A2 has disclosed a steering column in which a unit which bears the steering shaft is connected by way of fastening bolts to a part which is fixed with respect to the vehicle. The fastening bolts extend through elongated holes formed in the unit, whereby a displacement of the unit relative to the part which is fixed with respect to the vehicle is made possible in the event of a crash. In an initial position, the fastening bolts extend in each case through an enlarged section in the respective elongated hole. In the event of a crash, the adjoining section of the elongated hole, which is of smaller width, is successively flared by the fastening bolt, whereby energy absorption is realized. Similar steering columns are known from U.S. Pat. Nos. 3,769,851 and 6,378,903 B1.

A steering column of the type mentioned in the introduction emerges from EP 1 083 109 B1. In said document, too, it is the case in the event of a crash that the elongated holes through which the spindle bolts extend are flared, with absorption of energy, during the displacement of the spindle bolt in the elongated holes. Here, the bracket unit relative to which the adjustment unit which serves for the rotatable mounting of the steering shaft is fixed in the closed state of the locking apparatus is, in the event of a crash, released from a part which is fixed with respect to the vehicle and on which the bracket unit is mounted.

A disadvantage of steering columns in which the energy is absorbed between the spindle bolt and the first and second elongated holes through which said spindle bolt extends is that it must be ensured, with a high level of precision, that the conditions between the spindle bolt and the first elongated hole and between the spindle bolt and the second elongated hole are exactly identical. The steering column can otherwise be pulled into a skewed position in the event of a crash. Proper energy absorption is then no longer realized.

WO 2010/069448 A1 presents a steering column with first and second bolts which each extend through an elongated hole, wherein the two elongated holes are arranged at different distances from the steering wheel-side end of the steering shaft. By means of different inclinations of the two elongated holes, it is possible to realize a simultaneous length and height adjustment of the steering column during the displacement of the bolts in the elongated holes. Adjoining the adjustment region of the elongated holes, the latter have an energy absorption section, wherein in the event of a displacement of the bolt through the energy absorption section in the event of a crash, energy is absorbed.

A similar steering column which is simultaneously adjustable in length and height emerges from CN 102069840 A. In that case, however, energy absorption in the event of a crash takes place between two column parts of the steering column.

In the case of the steering column known from WO 2008/083811 A1, in the event of a crash, energy absorption takes place between a casing unit, which serves for the rotatable mounting of the steering shaft, and the adjustment unit, which in the open state of the locking apparatus is pivotable relative to the bracket unit about a pivot axis.

U.S. Pat. No. 7,874,228 B2 presents a design of a pivot spindle for the pivoting of an adjustment unit, which serves for the rotatable mounting of the steering shaft, relative to a bracket unit in the open state of a locking apparatus, in order to permit a height adjustment of the steering column. Here, two pivot bolts are provided which extend through elongated holes in the adjustment unit. In the open state of the locking apparatus, the pivot bolts can be displaced in the elongated holes, whereby a length adjustment of the adjustment unit is made possible.

It is an object of the invention to provide a steering column of the type mentioned in the introduction which has an energy absorption device for a crash situation, which steering column is easy to assemble and can be easily adapted to the respectively desired energy absorption conditions. This is achieved according to the invention by means of a steering column having the features of claim 1.

In the case of the steering column according to the invention, in a region situated between the first and the second elongated hole in relation to the direction of the pivot axis for the pivoting of the adjustment unit relative to the bracket unit, there is arranged an energy absorption part. The spindle bolt, which in the assembled state of the steering column is mounted so as to be fixed with respect to the vehicle (is rigidly connected to the chassis of the motor vehicle), interacts with said energy absorption part when, in the event of a vehicle crash, the adjustment unit is displaced relative to the spindle bolt and thus the spindle bolt is displaced in the first and second elongated holes. In this case, the energy absorption part is plastically deformed by the spindle bolt, wherein the spindle bolt exerts pressure on the energy absorption part and material of the energy absorption part is displaced.

In this way, it is possible in a simple and controlled manner to realize an absorption of energy when, in the event of a crash, the adjustment unit is displaced relative to the spindle bolt which is mounted so as to be fixed with respect to the vehicle. Here, very good guidance of the adjustment unit is made possible because the guidance of the spindle bolt in the first and second elongated holes is not impaired. The first and second elongated holes remain undeformed during a displacement of the spindle bolt in the longitudinal direction of said elongated holes.

The energy absorption part is composed preferably of metal, particularly preferably of a steel. It is however also conceivable and possible for the energy absorption part to be formed from a plastic or an elastomer.

There is expediently a sliding fit between the spindle bolt and those edges of the elongated holes which extend in the longitudinal direction of the elongated holes and which delimit the elongated holes in terms of width. There is thus a small amount of play between the spindle bolt and the edges which delimit the elongated holes in the longitudinal direction thereof.

In the assembled state and during normal operation, for as long as no vehicle crash has occurred, the spindle bolt is situated in an initial position relative to the elongated holes, and the adjustment part is held so as to be secured against a displacement relative to the spindle bolt, in the event of which the latter would be displaced in the elongated holes. Said retention is expediently free from play or exhibits only a small amount of play (which amounts to at least less than one tenth of the longitudinal extent of the elongated holes).

If, when the spindle bolt is situated in its initial position, the steering wheel-side end of the steering shaft is subjected to a force which is directed in the longitudinal direction of the longitudinal axis of the section of the steering shaft adjoining the steering wheel-side end of the steering shaft, and which acts in the sense of a collapse of the steering column (that is to say is directed toward the front of the vehicle), the spindle bolt expediently remains non-displaceable relative to the elongated holes and thus in its initial position (without play or with a small amount of play of less than one tenth of the longitudinal extent of the elongated holes) up to a threshold value (limit value) of said force. Said threshold value is to be set on a vehicle-specific basis or is to be defined through the construction. Said threshold value is advantageously greater than 700 N. The system must however preferably also be capable of being set for a threshold value below 2000 N. If said threshold value is overshot, the adjustment unit is then displaced relative to the spindle bolt, such that the spindle bolt is displaced relative to the elongated holes (wherein said spindle bolt approaches those ends of the elongated holes which are situated closer to the steering wheel-side end of the steering shaft). In this case, energy is absorbed owing to the interaction with the energy absorption part.

It is expediently the case that the energy absorption during the displacement of the spindle bolt proceeding from its initial position commences at least within a displacement travel which amounts to less than one fifth of the total possible displacement travel of the spindle bolt in the elongated holes. The interaction of the spindle bolt with the energy absorption part, and thus the energy absorption, preferably commences directly at the beginning of the displacement of the spindle bolt from its initial position.

An advantageous embodiment of the invention provides that, up to the threshold value of the force, above which the displacement of the spindle bolt in the elongated holes commences, the spindle bolt is held in its initial position, that is to say so as to be non-displaceable relative to the elongated holes and thus relative to the adjustment unit, by the energy absorption part.

It is advantageously the case that, in its initial position, the spindle bolt is situated in the region of those ends of the elongated holes which are averted from the steering wheel-side end of the steering shaft, that is to say are further remote from said end. Those edges of the elongated holes which delimit the longitudinal extent of the elongated holes in the direction away from the steering wheel-side end of the steering shaft thus support the spindle bolt in its initial position so as to prevent displacement of said spindle bolt relative to the adjustment unit in the direction away from the steering wheel-side end of the steering shaft.

The spindle bolt advantageously interacts with the energy absorption part at least over the major part of the possible displacement travel of the spindle bolt in the elongated holes, preferably over the entire possible displacement travel.

During the interaction of the spindle bolt with the energy absorption part when the spindle bolt is displaced in the elongated holes relative to the adjustment unit, the energy absorption part is plastically deformed. Energy is absorbed as a result of said plastic deformation. Is advantageously the case during the energy absorption that the elongated holes or the edges thereof are not plastically deformed. In this way, the guidance can be very accurately ensured over the entire travel during the energy absorption—the crash travel.

In an advantageous embodiment of the invention, the energy absorption part has a ramp. Said ramp has the effect that, with progressive displacement of the spindle bolt in the elongated holes, that is to say with increasing distance from the initial position of said spindle bolt, the spindle bolt penetrates to an ever-increasing depth into the energy absorption part. Thus, in the region of the ramp, the energy absorption part projects further into the movement path of the spindle bolt the further the spindle bolt has travelled from the initial position. Thus, the energy absorbed per unit distance of the displacement of the spindle bolt progressively increases. Such a ramp may extend over the entire distance over which the spindle bolt interacts with the energy absorption part during the displacement in the elongated holes, or may extend only over a part of said distance. The ramp advantageously extends over more than 50% of said total distance.

A particularly advantageous embodiment of the invention provides that the energy absorption part is formed by a separate component which, in the assembled state of the steering column, is fixed to the adjustment unit so as to be non-displaceable relative thereto and which projects into the movement path of the spindle bolt during the displacement thereof relative to the elongated holes, such that, during a displacement of the spindle bolt relative to the elongated holes, said component is squeezed between the spindle bolt and the adjustment unit at least over a part of said displacement. Said component is preferably inserted into a depression formed in the adjustment unit. Said depression is formed in that region of the adjustment unit which is situated between the first and the second elongated hole (in relation to the axial direction of the spindle bolt).

It is preferably the case that the energy absorption part is formed from sheet metal, preferably from sheet steel, and has a bulged region. The spindle bolt interacts with a surface of said bulged region. As viewed from that side of the energy absorption part which is situated opposite that surface of the energy absorption part which interacts with the spindle bolt, the energy absorption part thus has a depression. In other words, the energy absorption part has a trough-like form, wherein the surface which interacts with the spindle bolt is situated in the region of the base of the trough on the side directed away from the depression.

A sheet-metal part of said type may be formed in particular by way of a forming operation such as deep-drawing or stamping.

For the retention of the energy absorption part in the depression of the adjustment unit, the energy absorption part preferably has laterally projecting retention lugs. Said retention lugs project in the axial direction of the spindle bolt (in the direction of the pivot axis) from both sides of the bulged region of the energy absorption part. For example, it is possible for two projecting retention lugs to be provided on each side of the energy absorption part. By means of said retention lugs, the energy absorption part expediently digs into side walls of the depression in order to be fastened in the depression. For this purpose, the retention lugs arranged on the opposite sides of the energy absorption part may initially be oriented in a V shape with respect to one another. After the insertion of the energy absorption part into the depression, a pressing tool is mounted onto the retention lugs and the latter are bent in the direction of the base of the depression, wherein said retention lugs dig into the side walls of the depression.

The locking apparatus, in the open state of which the steering column is adjustable and in the closed state of which the set position of the steering column is fixed, may be designed in a variety of ways and may act in a non-positively locking and/or positively locking manner. Other designs of locking apparatuses that may basically be used are known from the prior art, for example also from the prior art mentioned in the introductory part of the description.

The steering shaft may be rotatably mounted by way of a casing unit, which in turn is borne by the adjustment unit. To perform a length adjustment of the steering column, the casing unit may, in the open state of the locking apparatus, be adjustable relative to the adjustment unit in the axial direction of the steering shaft (wherein two telescopic sections of the steering shaft are also displaced relative to one another). In the closed state of the locking apparatus, said displaceability of the casing unit is then fixed.

If it is the intention for the steering column to only be adjustable in height, an additional casing unit may also be omitted, with the steering shaft being directly rotatably mounted in the adjustment unit. In other words, the adjustment unit and the casing unit are then formed in one piece, or the adjustment unit is also formed as the casing unit which serves for rotatably mounting the steering shaft.

In the event of a crash, in order to permit the displacement of the adjustment unit relative to the spindle bolt which is mounted so as to be fixed with respect to the vehicle, it may be provided both in the case of a steering column embodiment which is only adjustable in height or tilt and in the case of a steering column embodiment which is moreover also adjustable in length that the connection between the bracket unit and the chassis of the motor vehicle is designed to be detachable (wherein the detachment occurs when the acting force exceeds a limit value). It could also be provided that the bracket unit is connected to an assembly unit mounted fixedly with respect to the vehicle, and is displaceable relative to said assembly unit when the acting force exceeds a limit value in the event of a crash. In this embodiment, in the event of a crash, the adjustment unit and the bracket unit which is connected thereto by way of the locking apparatus are jointly displaced relative to the spindle bolt which is mounted fixedly with respect to the vehicle.

On the other hand, it could also be provided that, in the event of a crash, when the force acting on the adjustment unit exceeds a threshold value, the adjustment unit can be displaced relative to the bracket unit, for example with the retention force of the closed locking apparatus imparted by non-positive locking being overcome.

Further advantages and details of the invention will be discussed below on the basis of the appended drawing, in which.

Figure 1:
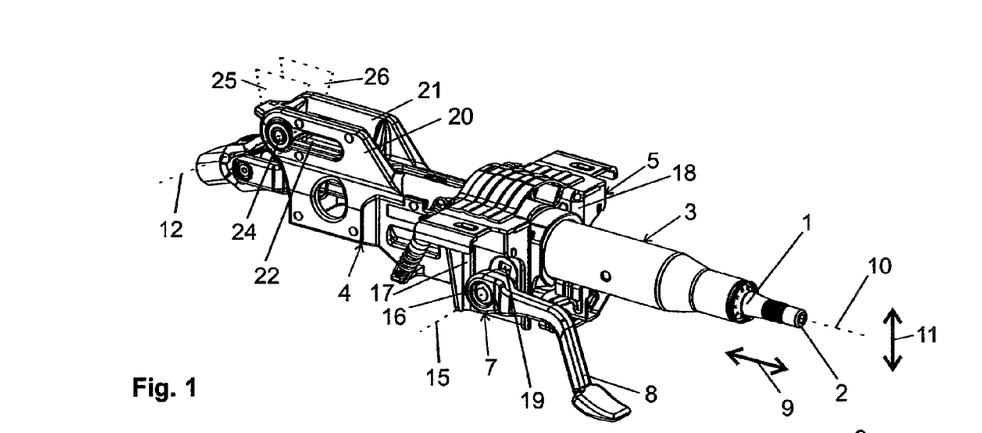
FIG. 1 shows an oblique view of a steering column according to an exemplary embodiment of the invention.
Figure 2:
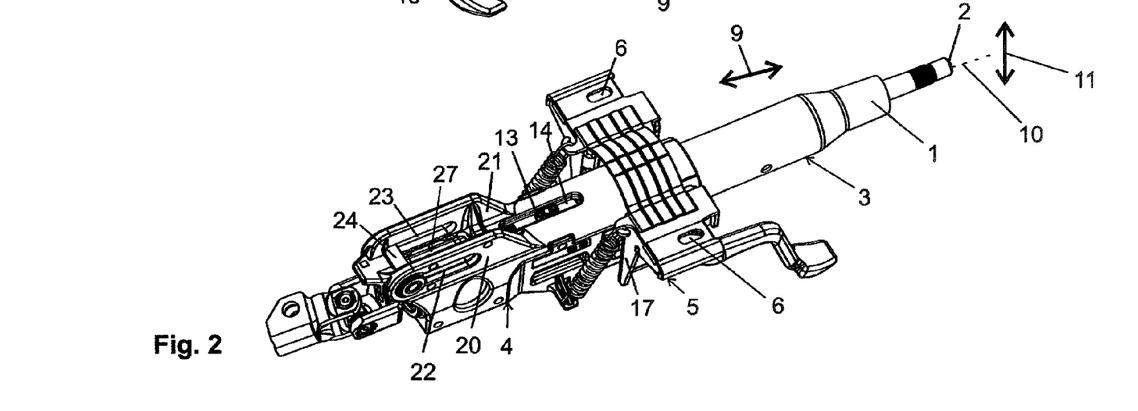
FIG. 2 shows an oblique view of the steering column from a different viewing angle.

An exemplary embodiment of the invention will be discussed below on the basis of FIGS. 1 to 3a, and 4 to 8a, and 9 and 10. FIGS. 3b and 8b show another embodiment of the invention. Identical components or components of identical function are denoted in the various embodiments by the same reference signs.

The steering column has a rotatably mounted steering shaft 1 to which a steering wheel can be attached at a steering wheel-side end 2. A section of the steering shaft 1 adjoining the steering wheel-side end is rotatably mounted by way of a casing unit 3. The casing unit 3 is borne by an adjustment unit 4, which in turn is borne by a bracket unit 5 which, at least during normal operation, for as long as no vehicle crash has occurred, is mounted fixedly with respect to the vehicle. For this purpose, in the exemplary embodiment, mounting holes 6 are illustrated which are extended through by mounting screws for the purposes of mounting on the motor vehicle.

In the exemplary embodiment, the adjustment unit 4 is in the form of a cast part, in particular an aluminum casting or a magnesium casting. The adjustment unit may also be in the form of a sheet-metal molded part, or may be manufactured from some other material.

The steering column has a locking apparatus 7 which, in the exemplary embodiment shown, can be adjusted between an open state and a closed state by way of an actuation lever 8. In the open state, the casing unit 3 can be adjusted relative to the adjustment unit 4 in the adjustment direction 9 for a length adjustment of the steering column, said direction lying parallel to the longitudinal axis 10 of that section of the steering shaft 1 which adjoins the steering wheel-side end 2. Furthermore, the adjustment unit 4 can be adjusted relative to the bracket unit 5 in the adjustment direction 11 for a height or tilt adjustment. For this purpose, the adjustment unit 4 is pivoted about a pivot axis 12. When the steering column is mounted in the motor vehicle, the pivot axis 12 is fixed with respect to the vehicle and oriented horizontally.

To rotationally secure the casing unit 3 relative to the adjustment unit 4, there is mounted on the casing unit a cam 13 which is guided in a slot 14 of the adjustment unit 3 so as to be displaceable in the direction of the longitudinal axis 10.

In the closed state of the locking apparatus 7, the set position of the steering column is locked, that is to say the casing unit 3 is held so as to be non-displaceable relative to the adjustment unit 4, and the adjustment unit 4 is held so as to be non-pivotable about the pivot axis 12 relative to the bracket unit 5.

Figure 3A:
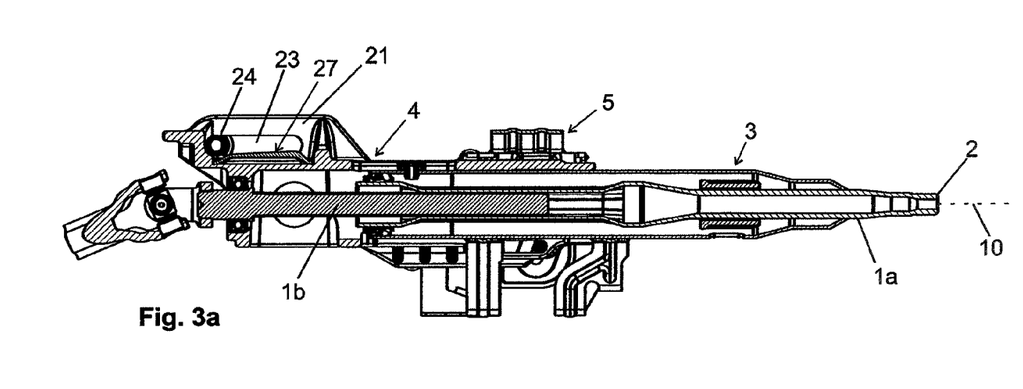
FIG. 3a shows a vertical longitudinal central section through the steering column.
Figure 3B:
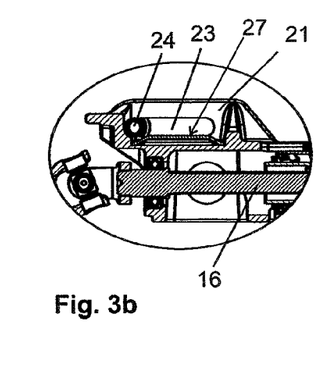
FIG. 3b shows a vertical longitudinal central section through a steering column with an alternative embodiment.
Figure 4:
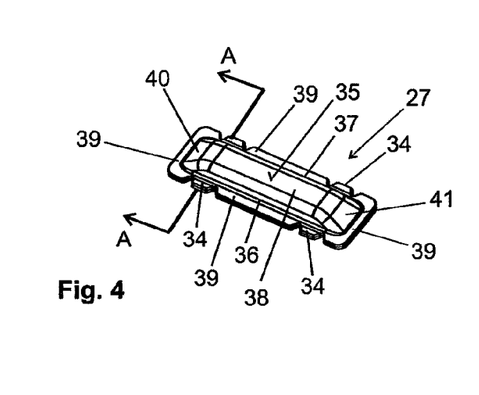
FIG. 4 shows an oblique view of the energy absorption part in the state before insertion into the depression in the adjustment unit.
Figure 5:
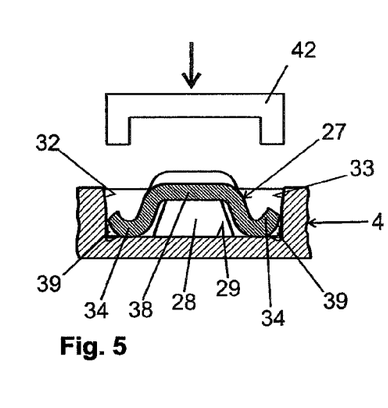
FIG. 5 shows a section along the line AA in FIG. 4 in the state in which the energy absorption part has been inserted into the depression but not yet connected to the adjustment unit, together with a schematically indicated pressing tool for bending the retention lugs, without the spindle bolt.
Figure 6:
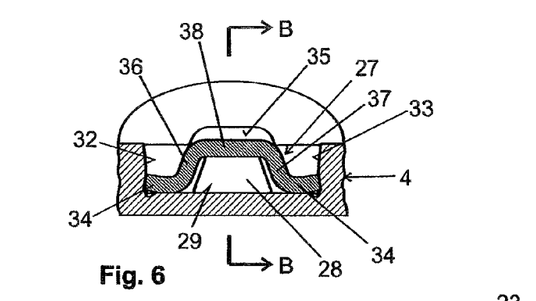
FIG. 6 is a sectional illustration, analogous to FIG. 5, in the state in which the energy absorption part is fastened in the depression.

For length adjustment of the steering column in the adjustment direction 9 in the open state of the locking apparatus 7, the steering shaft 2 has steering shaft sections 1a, 1b which can perform a telescopic movement relative to one another, cf. FIG. 3a.

The locking apparatus 7 may be designed in a variety of ways. For example, it may be provided that the actuation lever 8, as it pivots about the axis 15 of a clamping bolt 16 of the locking apparatus, rotates a cam disk about said axis 15 relative to a cam disk which is held so as to be non-rotatable about said axis 15, with bracing of the bracket unit 5, adjustment unit 4 and casing unit 3 being realized. Differently modified locking apparatuses may likewise be used. The parts (casing unit 3, adjustment unit 4 and bracket unit 5) that are locked by the locking apparatus may be held so as to be non-adjustable in the respective adjustment direction 9, 11 by non-positively locking and/or positively locking action. In the exemplary embodiment, the retention is realized by way of non-positive locking. The more exact design of the locking apparatus 7 is not the subject of the present invention. Differently designed locking apparatuses are known from the prior art, for example from the prior art mentioned in the introductory part of the description.

In the exemplary embodiment shown, the bracket unit 5 has side cheeks 17, 18 which extend to both sides of the adjustment unit and between which the adjustment unit 4 is situated. The side cheeks 17, 18 have elongated holes 19 which extend in the adjustment direction 11 and through which the clamping bolt 16 extends. In the closed state of the locking apparatus 7, the side cheeks 17, 18 are pressed against side surfaces of the adjustment unit 4. A slot of the adjustment unit 4, which slot is for example situated on the underside of the adjustment unit 4 and which extends in the direction of the longitudinal axis 10 and proceeds from that end of the adjustment unit 4 which points toward the steering wheel-side end 2 of the steering shaft 1, is compressed in the process, such that the casing unit 3 is clamped by the adjustment unit 4.

The adjustment unit 4 has a first and a second guide limb 20, 21, which guide limbs project from a base section of the adjustment unit 4. A first elongated hole 22 is formed in the first guide limb 20 and a second elongated hole 23 is formed in the second guide limb 21. The elongated holes 22, 23 have longitudinal extents lying parallel to one another. In the exemplary embodiment, the longitudinal extents of the elongated holes 22, 23 lie parallel to the longitudinal axis 10 of that section of the steering shaft 1 which adjoins the steering wheel-side end 2, as is preferred. Deviations from this are conceivable and possible, wherein such deviations from the parallel orientation with respect to the longitudinal axis 10 preferably amount to less than 30°.

As viewed in the direction of the pivot axis 12, the first and the second elongated hole 22, 23 have congruent extents.

The elongated holes 22, 23 are formed in a region of the adjustment unit 4 which is at a greater distance from the steering wheel-side end 2 of the steering shaft 1 than that region of the adjustment unit 4 which interacts with the locking apparatus 7.

The elongated holes 22, 23 are extended through by a spindle bolt 24 which forms the pivot axis 12. The axial direction of the spindle bolt 24 thus coincides with the pivot axis 12, and the pivot axis 12 extends through the spindle bolt 24. In the operational state of the steering column, the spindle bolt 24 is mounted fixedly with respect to the vehicle. In FIG. 1, dashed lines are used to indicate two fastening lugs 25, 26 which are mounted on the chassis of the motor vehicle and between which the spindle bolt 24 extends. The fastening lugs 25, 26 lie adjacent to the adjustment unit 4 at both sides.

The spindle bolt 24 has an outer diameter b which is smaller than the width B of the respective elongated hole 22, 23 as measured at right angles to the longitudinal extent of the respective elongated hole 22, 23. In this way, a degree of play for the displacement of the spindle bolt 24 in the longitudinal direction of the elongated holes 22, 23 is formed. The degree of play is preferably less than 0.5 mm.

The guide legs 20, 21 are spaced apart from one another (as viewed in the direction of the pivot axis 12). An energy absorption part 27 is arranged in the region situated between the first and the second guide leg 20, 21, and thus between the first and the second elongated hole 22, 23, as viewed in the direction of the pivot axis 12. The energy absorption part 27 is inserted into a depression 28, preferably a blind bore, of the adjustment unit 4. The depression 28 has a base 29 on which the energy absorption part 27 lies. In the depression 28, the energy absorption part 27 is also held so as to be secured against displacement relative to the adjustment unit 4 in the direction of the longitudinal axis 10 or in the direction of the longitudinal extent of the elongated holes 22, 23. For this purpose, the energy absorption part 27 lies against walls 30, 31 of the depression 28 which delimit the depression 28 in said direction, cf. FIG. 7.

Furthermore, for the retention of the energy absorption part 27 in the depression 28, laterally projecting retention lugs 34 of the energy absorption part 27 dig into side walls 32, 33 of the depression, as will be discussed in more detail further below.

The energy absorption part 27 is formed from an originally planar metal sheet. The finished energy absorption part 27 has a bulged region, wherein, in the event of a crash, during a displacement of the spindle bolt 24 in the elongated holes 22, 23, the spindle bolt 24 interacts with a surface 35 of the bulged region of the energy absorption part 27. In a cross section through the energy absorption part 27 running parallel to the pivot axis 12, the energy absorption part 27 has first and second lateral support webs 36, 37 which are connected by a top web 38, cf. FIGS. 5 and 6. The parts 36, 37 and 38 together have a U-shaped form as viewed in cross section. At their ends remote from the top web 38, the support webs 36, 37 are connected by way of curved portions to laterally projecting rest webs 39. The latter lie on the base 29 of the depression 28. Altogether, the energy absorption part 27 is of "hat-shaped" form as viewed in cross section.

The top web 38 is spaced apart from the base 29 of the depression 28 and runs parallel to said base as viewed in the cross section perpendicular to the displacement direction in the event of a crash.

Figure 7:
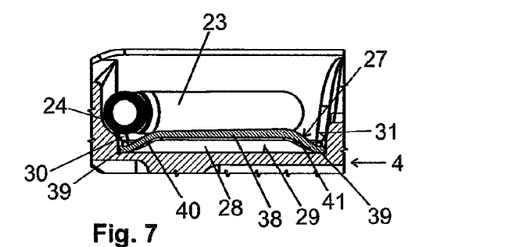
FIG. 7 shows a longitudinal section along the line BB in FIG. 6, together with the spindle bolt, during normal operation.

In the longitudinal central section through the energy absorption part 27 running parallel to the longitudinal axis of that section of the steering shaft 1 which adjoins the steering wheel-side end 2, said energy absorption part has end-side support webs 40, 41 which adjoin the top web 38 at both sides, cf. FIG. 7. At their ends remote from the top web 38, said support webs are connected by way of curved portions to forwardly and rearwardly projecting rest webs 39 which lie on the base 29. In the exemplary embodiment shown in FIG. 3*a*, as viewed in longitudinal section, the top web 38 runs in inclined fashion with respect to the base 29, whereby a ramp is formed. The inclination amounts to preferably less than 10°. Alternatively, in the exemplary embodiment shown in FIG. 3*b*, as viewed in longitudinal section, the top web 38 runs parallel with respect to the base 29, such that the top web 38 does not exhibit an inclination.

The laterally projecting retention lugs 34 are arranged in regions of recesses in the laterally projecting rest webs 39. After the formation of the energy absorption part 27 and before the latter is fastened to the adjustment unit 4, the retention lugs 34 are inclined obliquely upward in the direction pointing away from the plane of the longitudinal central section through the energy absorption part 27 (as viewed in cross section, in the direction of a straight line forming an extension of the top web 38). The retention lugs 34, which are arranged on opposite sides of the energy absorption part 27 as viewed in the cross section, are thus oriented in a V shape with respect to one another. In this state, the energy absorption part 27 is inserted into the depression 28, cf. FIG. 5. Here, the retention lugs 34 are spaced apart from the side walls 32, 33 of the depression 28 or lie against the side walls 32, 33 without digging into the latter. Subsequently, by means of a pressing tool schematically indicated in FIG. 5, the retention lugs 34 are pushed downward in the direction of the base 29. They thus come into intimate contact with the side walls 32, 33 and dig into the latter, cf. FIG. 6. In the state in which the retention lugs 34 are oriented parallel to the base 29 and thus lie parallel to the lateral support webs 36, 37, the retention lugs 34 extend further outward than the lateral support webs 36, 37. The energy absorption part 27 is thus fastened to the adjustment unit 4 by way of a very simple assembly process.

FIG. 7 shows the state assumed by the spindle bolt 24 during normal operation, for as long as no vehicle crash has occurred. Here, the spindle bolt 24 is situated in an initial position at those ends of the elongated holes 22, 23 which are remote from the steering wheel-side end 2 of the steering shaft 1. This state is also illustrated in FIGS. 1 and 2 and in FIGS. 3*a* and 3*b*.

The spindle bolt 24 can be supported, so as to be prevented from being displaced relative to the elongated holes 22, 23 from said initial position in the direction pointing away from the steering wheel-side end 2 of the steering shaft 1, by the end edges of the elongated holes 22, 23. The spindle bolt 24 is supported, so as to be prevented from being displaced relative to the adjustment unit 4 starting from the initial position in the direction toward the steering wheel-side end 2 of the steering shaft 1, for example by the energy absorption part 27. For this purpose, the spindle bolt 24 makes contact with a section, adjoining the top web 38, of the end-side support web 40. FIG. 7 indicates that there is a degree of play between the spindle bolt 24 and the energy absorption part 27. When the spindle bolt 24 is retained in the initial position by the energy absorption part 27, such play is however preferably non-existent or only very small (such that the possible displacement of the spindle bolt 24 without deformation of the energy absorption part 27 is preferably less than 1 mm).

The fixing of the spindle bolt 24 in the initial position relative to the elongated holes 22, 23 may also be realized in some other way, in particular also by way of two other interacting parts, as will be discussed further below. A combination of the stated measures is also possible.

When the steering wheel-side end 2 of the steering shaft 1 is subjected to a force acting in the direction of the longitudinal axis 10 in the sense of a collapse of the steering column, that is to say toward the front of the vehicle, the spindle bolt 24 remains in its initial position for as long as said force does not exceed a predefined threshold value (limit value). In the context of this document, a crash situation means that the threshold value is exceeded. Said threshold value is advantageously at least 800 N. The threshold value expediently lies below 2000 N. The level of the threshold value is configured in the design of the steering column. If the threshold value is exceeded, the adjustment unit 4 is displaced relative to the spindle bolt 24, which remains fixed with respect to the vehicle, wherein the spindle bolt 24 is displaced relative to the elongated holes 22, 23, specifically in a direction pointing toward the steering wheel-side end 2. Here, the spindle bolt 24 interacts with the energy absorption part 27, whereby energy is absorbed.

During the interaction of the spindle bolt 24 with the energy absorption part 27, the spindle bolt 24 runs against the energy absorption part 27 and plastically deforms the latter, by virtue of material of the energy absorption part being displaced. Here, the energy absorption part 27 is squeezed by the spindle bolt 24, that is to say a pressure is exerted on the energy absorption part 27 by the spindle bolt 24.

Figure 8A:
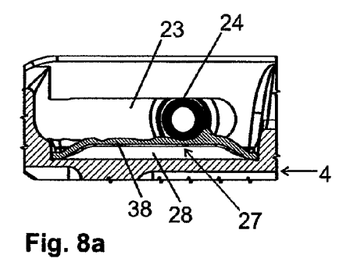
FIG. 8a shows a longitudinal section, analogous to FIG. 7 after a vehicle crash.
Figure 8B:
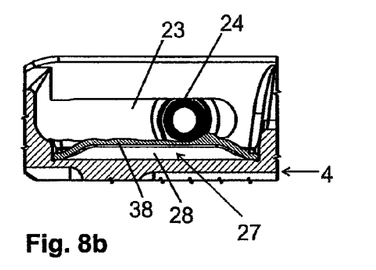
FIG. 8b shows a longitudinal section analogous to FIG. 3b after a vehicle crash.
Figure 9:
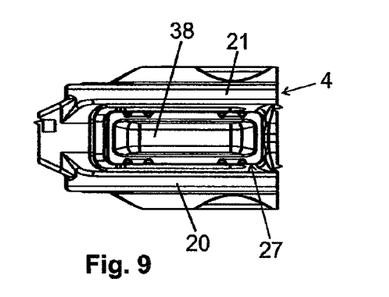
FIG. 9 shows a plan view of a section of the adjustment unit with the energy absorption part inserted into the depression (the spindle bolt is not illustrated)
Figure 10:
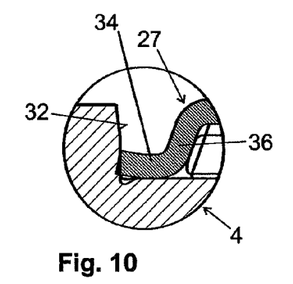
FIG. 10 shows an enlarged detail from FIG. 6.

The compressive stress that is imparted leads in particular to a flow of material of the energy absorption part 27. FIG. 8*a* and FIG. 8*b* show a state of the spindle bolt 24 in which the latter has been displaced out of the initial position, wherein the deformation of the energy absorption part 27, with a flow of material, has been illustrated on a greatly exaggerated scale. FIGS. 8*a* and 8*b* are intended to illustrate that the spindle bolt 24 preferably effects a flow of material of the energy absorption part 27, in particular of the top web 38, at least inter alia in the longitudinal direction of the elongated holes 22, 23. In the embodiment corresponding to FIG. 8*a*, the material displacement is greater, because the top web 38 is provided with an inclined ramp, by contrast to the embodiment corresponding to FIG. 8*b*, in which the top web 38 is oriented so as to run parallel to the base 29.

In addition to or instead of a flow of material of the top web 38, the pressure imparted by the spindle bolt 24 may also cause a deformation of the energy absorption part 27 for example in the region of the support webs 36, 37.

At least a part of the energy absorption may thus also be realized by way of deformation work performed on the energy absorption part 27 by the spindle bolt 24. Here, the energy absorption part 27 is subjected to compressive load. It is however preferable for at least a part, preferably at least a major part, particular preferably more than 90%, of the energy absorption to be realized not by way of bending work performed on the energy absorption part 27 but by way of other deformation work performed on the energy absorption part 27.

Owing to the ramp described, which has been formed by the top web 38 corresponding to the embodiment illustrated in FIG. 3*a* and FIG. 8*a*, the energy absorption part 27 projects to an increasing extent into the movement part of the spindle bolt 24 with increasing distance of spindle bolt 24 from its initial position, that is to say the overlap u (cf. FIG. 8*a*) of the spindle bolt with the energy absorption part 27 increases. The energy absorption thus increases with increasing distance from the initial position of the spindle bolt 24 during the displacement thereof in the elongated holes 22, 23. In the exemplary embodiment shown, the ramp has a constant inclination, that is to say lies in a plane. In other exemplary embodiments, it would be possible, for example, for the inclination of the ramp to increase with increasing distance from the initial position of the spindle bolt 24. A correspondingly progressive increase in energy absorption can thereby be realized.

An energy absorption part 27 formed with a ramp could also be referred to as being "wedge-shaped".

FIG. 8*a* corresponds to the embodiment of the steering column corresponding to FIG. 3*a*, in which the top web 38 is formed so as to rise in the manner of a ramp. In an entirely analogous manner, it is possible, corresponding to FIG. 3*b* and FIG. 8*b*, for the top web 38 to be oriented parallel to the displacement direction such that the level of energy absorption remains constant. The ramp may correspondingly also be omitted. Correspondingly, the overlap is constant over the movement path of the spindle bolt 24. FIG. 8*b* illustrates a situation after the crash, in which the top web, in the normal state, is oriented parallel to the displacement direction, corresponding to FIG. 3*b*. Here, all other features correspond to the features presented with reference to FIG. 3*a* and FIG. 8*a*. Other forms of the top web with a rising or falling configuration are furthermore conceivable and possible in order to thereby attain, for example, a defined force profile during the energy absorption.

The desired energy absorption may be set in a very simple manner by way of the shape of the energy absorption part, in particular the magnitude of the overlap u along the movement path of the spindle bolt 24, and/or the sheet-metal thickness and/or the material characteristics of the metal sheet.

To permit the displacement of the adjustment unit 4 relative to the spindle bolt 24 in the event of a crash, it may be provided in the exemplary embodiment shown that the bracket unit 5 can detach from the vehicle chassis in the event of a crash. For this purpose, the bracket unit 5 may for example be connected to the vehicle chassis by way of fastening screws which engage into slots, which are open toward the front of the vehicle, in the vehicle chassis. If a force acting on the bracket unit 5 in the direction of the longitudinal axis 10 toward the front of the vehicle exceeds a limit value, the fastening screws are pushed out of the open ends of the slots. Another possibility is for example for the bracket unit 5 to be connected to an assembly unit, which in turn is fastened to the vehicle chassis. The bracket unit 5 is, in the manner of a carriage, guided so as to be displaceable relative to the assembly unit in the direction of the longitudinal axis 10. Here, between the bracket unit 5 and the assembly unit, there is formed a breakaway connection which breaks if a force acting on the bracket unit 5 in the direction of the longitudinal axis 10 toward the front of the vehicle exceeds a limit value, whereupon the displacement between the bracket unit 5 and the assembly unit is made possible. A breakaway connection of said type may be realized for example by way of a plastics part. If the spindle bolt 24 is held in its initial position by the energy absorption part 27 or by other interacting parts, it would also be possible for a breakaway connection of said type to be omitted.

In another possible embodiment, it could also be provided that the adjustment unit 4 is displaceable relative to the bracket unit 5 in the event of the force exceeding the threshold value, up to which the spindle bolt 24 remains in its initial position. For example, said displaceability could be made possible by virtue of the locking force imparted by the closed locking apparatus 7 being overcome. In the exemplary embodiment shown, this would be made possible by virtue of the friction force between the side cheeks 17, 18 and the side surfaces of the adjustment unit 4 being overcome. Here, it would be possible for the clamping bolt 16 to extend through elongated holes, running parallel to the elongated holes 22, 23, in the adjustment unit 4.

In other design variants of the invention, it would also be possible for the energy absorption part to be fastened to the adjustment unit 4 in some other way, for example by welding. A materially integral form of the energy absorption part 27 with the adjustment unit 4 is basically also conceivable and possible.

It would also be possible for the spindle bolt 24 to be of multi-part form, and to comprise, for example, an inner journal and a sleeve which is arranged on the latter and situated in the region between the elongated holes 22, 23.

Additional energy absorption mechanisms could be provided, for example between the cam 13 and the slot.

LIST OF REFERENCE DESIGNATIONS

| | |
|---|---|
| 1 | Steering shaft |
| 1a | Steering shaft section |
| 1b | Steering shaft section |
| 2 | Steering wheel-side end |
| 3 | Casing unit |
| 4 | Adjustment unit |
| 5 | Bracket unit |
| 6 | Mounting hole |
| 7 | Locking apparatus |
| 8 | Actuation lever |
| 9 | Adjustment direction |
| 10 | Longitudinal axis |
| 11 | Adjustment direction |
| 12 | Pivot axis |
| 13 | Cam |
| 14 | Slot |
| 15 | Axis |
| 16 | Clamping bolt |
| 17 | Side cheek |
| 18 | Side cheek |
| 19 | Elongated hole |
| 20 | First guide limb |
| 21 | Second guide limb |
| 22 | First elongated hole |
| 23 | Second elongated hole |
| 24 | Spindle bolt |
| 25 | Fastening lug |
| 26 | Fastening lug |
| 27 | Energy absorption part |
| 28 | Depression |
| 29 | Base |
| 30 | Wall |
| 31 | Wall |
| 32 | Side wall |
| 33 | Side wall |
| 34 | Retention lug |
| 35 | Surface |

| 36 | Lateral support web |
| --- | --- |
| 37 | Lateral support web |
| 38 | Top web |
| 39 | Rest web |
| 40 | End support web |
| 41 | End support web |
| 42 | Pressing tool |

The invention claimed is:

1. A steering column for a motor vehicle comprising a rotatably mounted steering shaft and an adjustment unit which bears a section of the steering shaft adjoining a steering wheel-side end of the steering shaft and which, in an open state of a locking apparatus, is pivotable relative to a bracket unit about a pivot axis for adjustment of the steering column in an adjustment direction for a height or tilt adjustment and the pivoting of which relative to the bracket unit about the pivot axis is locked in a closed state of the locking apparatus, wherein the pivot axis is formed by a spindle bolt which can be mounted so as to be fixed with respect to the vehicle and which extends through a first and a second elongated hole of the adjustment unit, wherein prior to any vehicle crash the adjustment unit remains mounted fixedly with respect to the spindle bolt, and wherein, in the event of a vehicle crash, the adjustment unit is displaceable relative to the spindle bolt with displacement of the spindle bolt in the elongated holes, wherein in a region situated between the first and the second elongated holes in relation to the direction of the pivot axis, there is arranged an energy absorption part with which the spindle bolt, during the displacement thereof in the elongated holes, interacts with plastic deformation of the energy absorption part owing to exertion of pressure on the energy absorption part and displacement of material of the energy absorption part, whereby energy is absorbed as a result of the plastic deformation of the energy absorption part.

2. The steering column as claimed in claim 1, wherein the energy absorption part has a ramp which has the effect that, with progressive displacement of the spindle bolt in the elongated holes, the spindle bolt penetrates to an ever increasing depth into the energy absorption part.

3. The steering column as claimed in claim 2, wherein the ramp of the energy absorption part extends over at least half of a longitudinal extent of the elongated holes.

4. The steering column as claimed in one of claims 1 to 3, wherein when a force acts on the steering wheel-side end of the steering shaft in a direction of the longitudinal axis of the section of the steering shaft adjoining the steering wheel-side end, up to a threshold value of said force, the spindle bolt remains in an initial position relative to the elongated holes, and in that, in the event of the threshold value of said force being exceeded, the adjustment unit is displaced relative to the spindle bolt, wherein the spindle bolt is displaced relative to the elongated holes.

5. The steering column as claimed in claim 4, wherein up to the threshold value of the force, the spindle bolt is held in the initial position at least inter alia by the energy absorption part.

6. The steering column as claimed in one of claims 1, 2, 3, or 5, wherein the first and second elongated holes are arranged in first and second guide legs of the adjustment unit which project from a base section of the adjustment unit.

7. The steering column as claimed in one of claims 1, 2, 3, or 5, wherein the outer diameter of the spindle bolt in its sections in which it extends through the first and second elongated holes is smaller than the width of the first and second elongated holes.

8. The steering column as claimed in one of claims 1, 2, 3, or 5, wherein the energy absorption part is a component which is fastened to the adjustment unit and which, when it interacts with the spindle bolt, is squeezed between the spindle bolt and the adjustment unit.

9. The steering column as claimed in one of claims 1, 2, 3, or 5, wherein the energy absorption part is formed from sheet metal and has a bulged region, a surface of which interacts with the spindle bolt.

10. The steering column as claimed in claim 9, wherein the energy absorption part, as viewed in a cross section running parallel to the pivot axis, has first and second lateral support webs and a top web which connects the lateral support webs and which, on its top side, has the surface which interacts with the spindle bolt.

11. The steering column as claimed in claim 9, wherein the energy absorption part has laterally projecting rest webs by which it rests on the base of the depression.

12. The steering column as claimed in claim 9, wherein the energy absorption part has, for retention in the depression, laterally projecting retention lugs which interact with side walls of the depression.

13. The steering column as claimed in claim 12, wherein the retention lugs dig into the side walls.

14. A method for forming a steering column as claimed in claim 12, wherein firstly, the energy absorption part is formed with retention lugs which are arranged on opposite sides of the energy absorption part and which are oriented in a V shape with respect to one another, and in that, after the insertion of the energy absorption part into the depression in the adjustment unit, the retention lugs are bent by way of a pressing tool in the direction of a base of the depression, wherein the retention lugs dig into side walls of the depression.

15. A steering column for a motor vehicle comprising:
a rotatably mounted steering shaft;
an adjustment unit that bears a section of the steering shaft adjoining a steering wheel-side end of the steering shaft, wherein in an open state of a locking apparatus a length of the steering column is adjustable and the adjustment unit is pivotable relative to a bracket unit about a pivot axis for adjustment of the steering column in an adjustment direction for a height or a tilt adjustment, wherein in a closed state of the locking apparatus the length of the steering column is not adjustable and the adjustment unit is prevented from pivoting relative to the bracket unit about the pivot axis;
a spindle bolt disposed along the pivot axis, wherein the spindle bolt is securable to the motor vehicle and extends through a first and a second elongated hole of the adjustment unit, wherein prior to any vehicle crash the adjustment unit remains mounted fixedly with respect to the spindle bolt, wherein in the event of a vehicle crash the adjustment unit is displaceable relative to the spindle bolt with displacement of the spindle bolt in the elongated holes; and
an energy absorption part disposed in the adjustment unit in a region situated between the first and the second elongated holes in relation to the direction of the pivot axis, wherein the energy absorption part plastically deforms when the spindle bolt is displaced in the elongated holes and applies pressure against the energy absorption part.

* * * * *